US012719380B2

(12) United States Patent
Barraco et al.

(10) Patent No.: US 12,719,380 B2
(45) Date of Patent: Aug. 25, 2026

(54) DC-TO-DC CONVERTER FOR AN ELECTRICAL AIRCRAFT PROPULSION SYSTEM

(71) Applicants: SAFRAN HELICOPTER ENGINES, Bordes (FR); CENTRE NATIONAL DE LA RECHERCHE SCIENTIFIQUE, Paris (FR); UNIVERSITE DE LORRAINE, Nancy (FR)

(72) Inventors: Thomas Michel Andre Gerard Barraco, Moissy-Cramayel (FR); Thomas Klonowski, Moissy-Cramayel (FR); Serge Lionel Pierfederici, Vandoeuvre les Nancy (FR); Mathieu Robert Weber, Vandoeuvre les Nancy (FR)

(73) Assignees: SAFRAN HELICOPTER ENGINES, Bordes (FR); CENTRE NATIONAL DE LA RECHERCHE SCIENTIFIQUE, Paris (FR); UNIVERSITE DE LORRAINE, Nancy (FR)

( * ) Notice: Subject to any disclaimer, the term of this patent is extended or adjusted under 35 U.S.C. 154(b) by 125 days.

(21) Appl. No.: 18/726,978

(22) PCT Filed: Dec. 27, 2022

(86) PCT No.: PCT/FR2022/052514
§ 371 (c)(1),
(2) Date: Jul. 5, 2024

(87) PCT Pub. No.: WO2023/131755
PCT Pub. Date: Jul. 13, 2023

(65) Prior Publication Data

US 2025/0112559 A1 Apr. 3, 2025

(30) Foreign Application Priority Data

Jan. 7, 2022 (FR) ...................................... 2200108

(51) Int. Cl.
*H02M 3/335* (2006.01)
*B64D 27/33* (2024.01)
(Continued)

(52) U.S. Cl.
CPC ...... *H02M 3/33584* (2013.01); *B64D 27/357* (2024.01); *H02M 3/33573* (2021.05); *B64D 27/33* (2024.01); *H02J 2105/32* (2026.01)

(58) Field of Classification Search
CPC .......... H02M 3/33573; H02M 3/33584; B64D 27/33; B64D 27/357; H02J 2105/32
See application file for complete search history.

(56) References Cited

U.S. PATENT DOCUMENTS 6,636,430 B1 * 10/2003 Batarseh ............. H02M 1/4258 363/21.01
2015/0295421 A1 10/2015 Blakemore et al.
(Continued)

FOREIGN PATENT DOCUMENTS

EP 3519294 A1 8/2019
WO 2019/186042 A1 10/2019
(Continued)

OTHER PUBLICATIONS

International Search Report and Written Opinion received for PCT Patent Application No. PCT/FR2022/052514, mailed on Apr. 24, 2023, 20 pages (9 pages of English Translation and 11 pages of Original Document).

*Primary Examiner* — Jue Zhang
(74) *Attorney, Agent, or Firm* — WOMBLE BOND DICKINSON (US) LLP

(57) ABSTRACT

A DC-to-DC converter for an electrical aircraft propulsion system designed to be connected in series with an electrical energy storage unit of the electrical propulsion system. The DC-to-DC converter includes an inverter, a transformer and a rectifier, and further includes a current source that is connected to the rectifier and is configured to control the power passing through the DC-to-DC converter. The transformer includes a primary and two secondaries, the two secondaries sharing a common terminal designed to be connected to a high-voltage DC bus of the electrical pro-
(Continued)

pulsion system and two other terminals that are connected to the rectifier. The rectifier includes two arms including at least two transistors that are each in series and are connected, on the one hand, to the two other terminals of the transformer and, on the other hand, to the current source.

17 Claims, 6 Drawing Sheets

(51) Int. Cl.
*B64D 27/357* (2024.01)
*H02J 105/30* (2026.01)

(56) References Cited

U.S. PATENT DOCUMENTS

2020/0083791 A1* 3/2020 Latulipe .................. H02P 27/06
2020/0115062 A1* 4/2020 Klonowski ............ B64U 10/16
2021/0172382 A1* 6/2021 Bruce ..................... F01D 15/10
2021/0296993 A1 9/2021 Liu et al.
2021/0380263 A1* 12/2021 Zhang ..................... B60L 50/50

FOREIGN PATENT DOCUMENTS

WO 2020/201639 A1 10/2020
WO 2021/068085 A1 4/2021
WO 2021/203735 A1 10/2021

* cited by examiner

DC-TO-DC CONVERTER FOR AN ELECTRICAL AIRCRAFT PROPULSION SYSTEM

TECHNICAL FIELD OF THE INVENTION

The invention relates to the field of electrical aircraft propulsion system and, in particular, to a DC-to-DC converter for such a network.

TECHNICAL BACKGROUND

It is known from prior art that the hybrid propulsion architecture of an aircraft, commonly referred to as series hybridisation, makes joint use of a thermoelectric source and an electrical energy storage unit connected to the same High Voltage Direct Current (HVDC) bus, which supplies the loads of an aircraft.

In the following, the acronym DC stands for "Direct Current" and AC for "Alternative Current".

As shown in FIG. 1, a hybrid propulsion architecture 101 generally comprises:

- an internal combustion engine 103 controlled by a control unit 105,
- an electric generator 107 coupled to the internal combustion engine so that in operation the internal combustion engine 103 drives the electric generator 107,
- a rectifier 109 connected to the electric generator 107 and configured to convert an alternating current (in this case a three-phase current) supplied by the electric generator 107 into a direct current,
- DC-to-AC converters (converting alternating current to direct current) 113*a* and 113*b*,
- a high voltage DC bus 111 connecting the rectifier 109 to the DC-to-AC converters 113*a* and 113*b*,
- electric motors 115*a* and 115*b* connected to the DC-to-AC converters 113*a* and 113*b* so that in operation the DC-to-AC converters 113*a* and 113*b* supply the electric motors 115*a* and 115*b* with alternating current, and
- propellers 117*a* and 117*b* coupled to the electric motors 115*a* and 115*b* so that in operation the electric motors 115*a* and 115*b* drive the propellers 117*a* and 117*b*.

The architecture 101 also comprises an electrical energy storage unit 119 (also known as HVDC storage) meaning high voltage DC storage, such as a battery. This electrical storage unit can perform the following functions: absorb surplus electrical energy from the HVDC bus, provide an additional electrical energy supply during transient phases, or act as the main energy source with the combustion engine or as a replacement for the combustion engine, in the event of a failure for example. In particular, when a return of electrical energy on the HVDC bus occurs, the storage unit 119 absorbs this excess electrical energy in order to protect the components of the HVDC bus.

In such an architecture, using a fossil fuel source, the internal combustion engine 103, the electric generator 107 and an electric propulsion chain made up of DC-to-AC converters 113*a* and 113*b*, electric motors 115*a* and 115*b* and propellers 117*a* and 117*b* allow to fly an aircraft with multiple rotating wings.

An aircraft comprising such a hybrid propulsion architecture is multi-rotor, which allows to provide additional degrees of freedom, compared to the conventional aircrafts, with respect to the controllability of the aircraft, for example the braking, the avoidance strategy, the change of direction, or the tilting of the rotors.

Other examples of an architecture of this type are described in the patent EP-B1-3519294 and in the patent application WO-A1-2019186042 in which a plurality of medium power generators are connected in parallel to an HVDC bus. In addition, in the various known architectures, the HVDC buses can also be multiple or connected in a ring network.

In any case, such an architecture can be used for a VTOL (Vertical Take-Off and Landing) type aircraft or for a CTOL (Conventional Take-Off and Landing) type aircraft.

In an architecture of this type, where the loads connected to the HVDC bus are electric motors driving the aircraft's propellers, which generally operate at constant power, it is essential to maintain optimum control of the HVDC bus to avoid instabilities or even the complete loss of the bus through voltage collapse.

Thus, as described above, it is known to use an electrical energy storage unit to enable this control.

In addition, this electrical energy storage unit may or may not be associated with a DC-to-DC converter whose role is, in particular, to adapt the voltage level and the current level delivered by the storage unit.

In a first approach, the electrical energy storage unit is connected to the rest of the electrical propulsion network without the use of a DC-to-DC converter. This is known as a direct connection.

The direct connection of one or more batteries (i.e., electrical energy storage units) allows to minimize the mass of the entire electrical network. In fact, the addition of a DC-to-DC converter has a cost not only in terms of mass, but also in terms of volume, efficiency, heat dissipation and control complexity.

However, due to the electrochemical nature of a battery, this configuration imposes restrictions to protect the battery. This is because the mains voltage is imposed by the battery(ies), which all "see" the same voltage.

In addition, the voltage level of the network has an impact on the state of charge of the battery(ies). As the latter varies, the electrical quantities of the batteries vary accordingly.

Finally, in a direct connection configuration, the state of charge of batteries connected to the same electrical network is identical. This means that when an additional battery is connected to the electrical propulsion system, the voltages have to be balanced and a high current flows between the batteries during what is known as a transient regime, which can disrupt or degrade the operation of the elements of the network. The impact of this transitory regime can be limited by the use of dedicated systems, but these are potentially heavy and bulky.

A second approach is to use a DC-to-DC converter at the interface between the electrical energy storage unit and the rest of the electrical propulsion system.

The addition of such a DC-to-DC converter offers multiple advantages. Firstly, the voltage of the electrical energy storage unit is decoupled from that of the rest of the electrical propulsion system, enabling a different voltage level to be maintained between the energy storage unit and that of the HVDC bus. Secondly, the DC-to-DC converter can be a voltage step-up and/or step-down, i.e., it can allow the voltage at its output to be increased or decreased relative to that supplied as input by the electrical energy storage unit. Thirdly, when the DC-to-DC converter is of the reversible current type, it is also possible to control the energy level, also known as the state of charge (SOC) of the energy storage unit.

This enables the use of several storage units in parallel, each with its own DC-to-DC converter, independent of each other and each protected from current variations. It also allows easy connection to a new energy storage unit without the risk of causing a potentially harmful transient regime.

Such a DC-to-DC converter at the interface between the electrical energy storage unit and the rest of the electrical propulsion system also allows to add, where appropriate, a galvanic isolation property (i.e., the absence of a conductive link between two parts of the electrical network). The DC-to-DC converter then has a so-called full bridge structure, for example a controlled full bridge structure known as DAB, which stands for "Dual Active Bridge".

However, as mentioned above, taking all these properties into account comes at a cost in terms of mass, volume, performance and control complexity. In particular, known DC-to-DC converters are designed to transmit the total power of the electrical energy storage unit, which necessarily implies a large mass of passive components and high current/voltage ratings (i.e., the ability to transmit currents/voltages) depending on the application. Moreover, the yields of such systems rarely exceed 90%.

SUMMARY OF THE INVENTION

The present invention proposes a solution to these disadvantages.

To this end, according to a first aspect, the invention relates to a DC-to-DC converter for an electrical aircraft propulsion system designed to be connected in series with an electrical energy storage unit of said electrical propulsion system, said DC-to-DC converter comprising an inverter configured to supply a first AC voltage from a DC input voltage coming from the electrical energy storage unit, a transformer configured to supply at least one second AC voltage from the first AC voltage and a rectifier configured to supply a DC output voltage from said at least one second AC voltage,

- said DC-to-DC converter being characterised in that it further comprises a current source, connected to the rectifier and configured to control the power passing through said DC-to-DC converter,
- in that the transformer comprises a primary and two secondaries, the two secondaries having a common terminal designed to be connected to a high-voltage DC (HVDC) bus of the electrical propulsion system and two other terminals connected to the rectifier, the reference levels of the DC-to-DC converter and the HVDC bus being connected to each other through the current source,
- and in that the rectifier comprises two arms, each comprising at least two transistors in series and connected, on the one hand, to the two other terminals of the transformer and, on the other hand, to the current source.

The DC-to-DC converter according to the invention may comprise one or more of the following characteristics, taken in isolation from each other or in combination with each other:

- the current source comprises an inductor and an electrical energy storage unit.
- the inverter comprises a plurality of transistors, preferably four MOSFET-type or IGBT-type transistors.
- the transistors have a switching frequency greater than a few tens of kHz, advantageously of the order of or greater than a hundred kHz.
- the transformer is configured to step down said at least one second AC voltage relative to the first AC voltage.
- the transformer is of the planar type or of the wound type.
- the transformer is configured to provide galvanic isolation between the primary and the two secondaries of said transformer.
- the rectifier comprises four transistors with two transistors connected in series to each secondary of the transformer, said transistors being of the MOSFET type.
- the gates of the two transistors connected in series to each secondary are common.
- the gates of the two transistors connected in series to each secondary are separate.
- diodes, connected in parallel to the transistors, are configured to protect said transistors from overvoltages.
- at least one filter, preferably of the RC filter type, is connected between the transformer and the rectifier.
- a filter, preferably of the RC filter type, is connected to the terminals of each arm of the rectifier, in parallel with the transistors.

According to a second aspect, the invention also concerns an electrical aircraft propulsion system comprising at least one thermoelectric source and an electrical energy storage unit configured to supply electrical energy to a high-voltage DC bus designed to supply charges, said electrical aircraft propulsion system further comprising a DC-to-DC converter according to the first aspect.

The electrical propulsion system according to the invention may comprise one or more of the following characteristics, taken in isolation from each other or in combination with each other:

- the electrical energy storage unit is an electrolytic current source, such as a supercapacitor, or an electrochemical current source, such as a battery.
- the electrical propulsion system further comprises a contactor configured to connect directly, when activated, a high potential of the high-voltage DC bus with a high potential of the electrical energy storage unit.

Finally, in a third aspect, the invention relates to an aircraft comprising an electrical propulsion system according to the second aspect.

BRIEF DESCRIPTION OF THE FIGURES

The present invention will be better understood and other details, characteristics and advantages of the present invention will become clearer on reading the following description of an illustrative and non-limiting example of the invention, with reference to the appended drawings in which.

The elements having the same functions in the different embodiments have the same references in the figures.

DETAILED DESCRIPTION OF THE INVENTION

Figure 1:
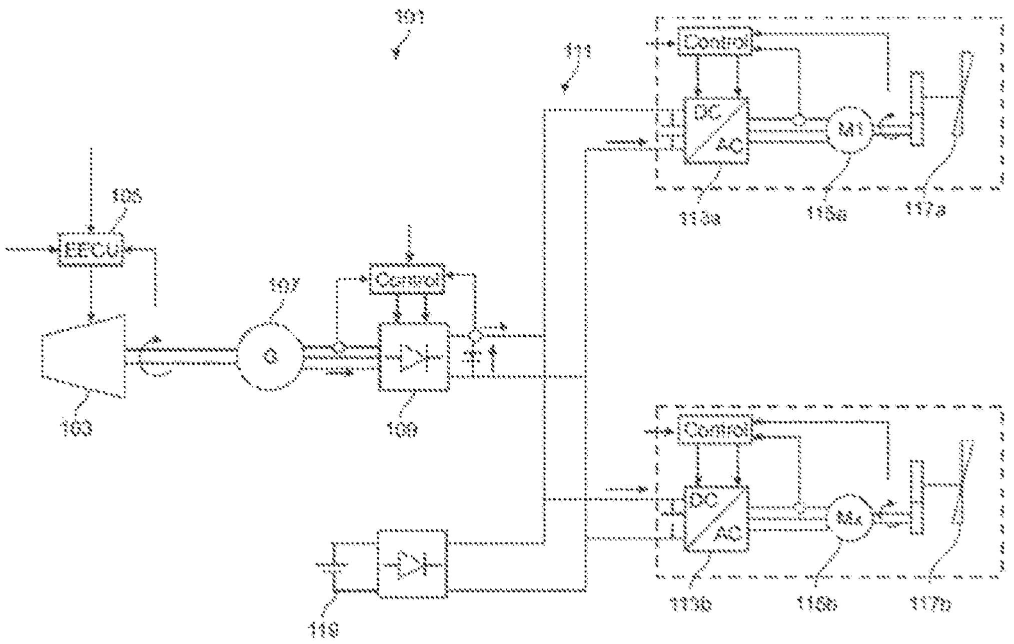
FIG. 1 is a schematic representation of an embodiment of the hybrid propulsion architecture of an aircraft in the prior art.
Figure 2:
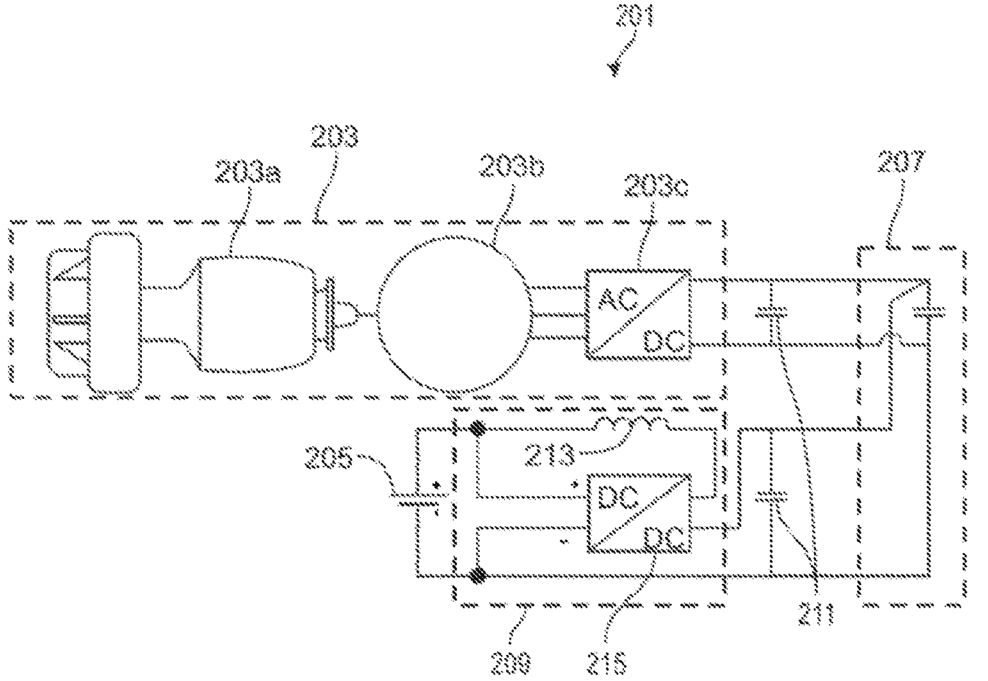
FIG. 2 is a schematic representation of an embodiment of an electrical aircraft propulsion system according to the invention.
Figure 3:
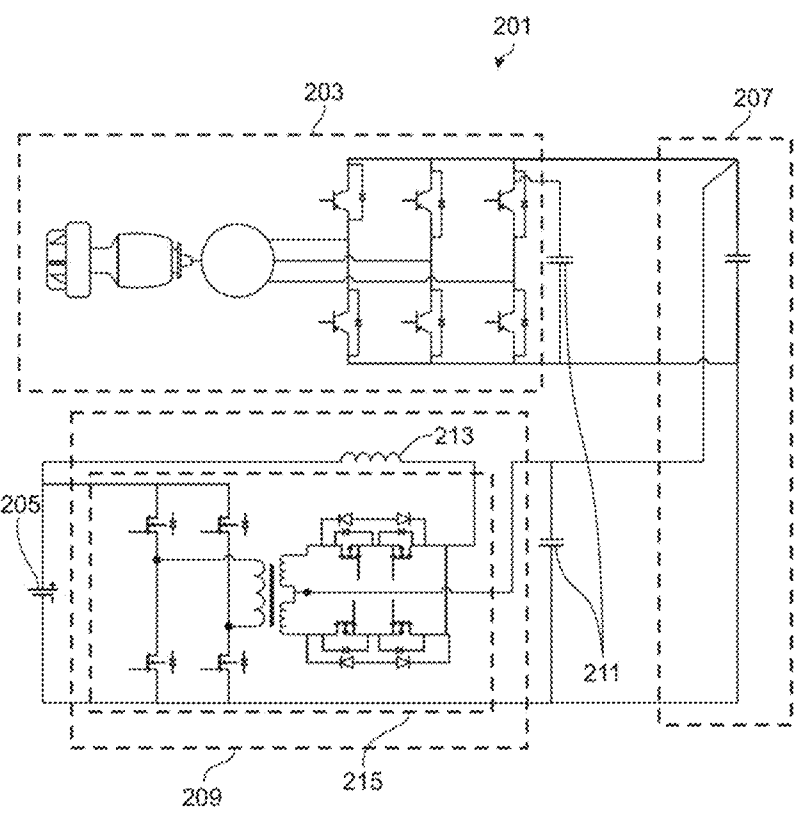
FIG. 3 is a schematic representation of an embodiment of an electrical aircraft propulsion system according to the invention.

With reference to FIG. 2 and FIG. 3, we will now describe an electrical aircraft propulsion system 201 according to the invention.

The electrical propulsion system 201 comprises at least one thermoelectric source 203 and an electrical energy storage unit 205 which are configured to supply electrical energy to a high voltage direct current (HVDC) bus 207.

In the example shown, the thermoelectric source 203 comprises an internal combustion engine 203*a*, an electric generator 203*b* coupled to the internal combustion engine 203*a* and a rectifier 203*c* connected to the electric generator 203*b*. The thermoelectric source 203 delivers a direct current to the HVDC bus 207.

The HVDC bus 207 is designed to supply (non-represented) loads such as the electric motors of an aircraft. The aircraft concerned may be a VTOL or CTOL aircraft. The invention is particularly well suited to aircraft weighing less than 5 tonnes and with on-board mechanical power of between 50 and 2000 kW.

The electrical aircraft propulsion system 201 also comprises a DC-to-DC converter 209 (for direct current/direct current), connected in series with the electrical energy storage unit 205, at the interface between the electrical energy storage unit 205 (also called "HVDC storage") and the HVDC bus 207.

One or more capacitors 211 are usually provided at the output of the thermoelectric source 203 and the DC-to-DC converter 209. These capacitors ensure that the loads connected to the HVDC bus, i.e., all the inverters and motors driving the propellers, are indeed voltage sources.

In the various embodiments of the electrical propulsion system 201, the electrical energy storage unit 205 may be an electrolytic current source, such as a supercapacitor, or an electrochemical current source, such as a battery. In both cases, the energy storage unit behaves, during different operating phases, as an energy source (i.e., in source mode) or as a charge (i.e., in charge mode). In addition, the invention also applies to an energy storage unit comprising solely as a non-reversible energy source, such as a solar panel or a cell.

A source of the supercapacitor type has the characteristic of being able to provide power peaks, that is, strong power for a very short period of time. For example, the supercapacitors are very useful for responding in transient mode to the high power demands that can be associated with a take-off phase of the aircraft. However, they are not suitable for long-term power requirements. On the other hand, the supercapacitors are capable of withstanding a very large number of charge/discharge cycles.

Conversely, a battery is not suitable for responding to power peaks. It is capable of delivering average power over a long period. A battery gives you a great deal of energy autonomy. However, it can withstand fewer charge/discharge cycles.

In addition to the plurality of elements constituting the DC-to-DC converter 209 grouped together in the assembly 215, described in detail below with reference to FIGS. 4 to 9, the DC-to-DC converter 209 according to the invention comprises an inductor 213 connected to the output of this assembly 215 on the one hand and to the positive terminal of the storage unit 205 on the other hand, in order to control the current between the storage unit 205 and the HVDC bus 207.

In particular, the inductor 213 forms, with the assembly 215, a so-called Partial Power Converter (PPC) which, depending on the application, allows not to transfer all the power emitted by the storage unit 205 to the HVDC bus 207.

In the examples shown in FIG. 2 and FIG. 3, it is the combination of the inductor 213 connected to the storage unit 205 that controls the level of current flowing between the storage unit 205 and the HVDC bus 207. However, in other embodiments (not shown), this function may be obtained by associating this same inductor 213 connected to the output of the assembly 215 with another energy storage unit of the electrical propulsion system 201.

In all cases, an inductor and an energy storage unit connected to each other perform the function of controlling the current flowing between the storage unit 205 and the HVDC bus 207.

In addition, the use of this inductor means that, during a phase in which the storage unit 205 is charging, the majority of the power transiting from the HVDC bus to the storage unit can transit via said inductor. In this case, the yield of the assembly is close to 1.

Furthermore, in a particular embodiment, the electrical propulsion system 201 may also comprise a contactor (not shown) configured to directly connect, when activated, a high potential of the HVDC bus 207 with a high potential of the electrical energy storage unit 205.

Advantageously, this contactor enables the electrical energy storage unit 205 to be connected directly to the HVDC bus 207 so that any failure of the DC-to-DC converter 209 does not result in the loss of the electrical energy storage unit 205 or of the HVDC bus 207.

Figure 4:
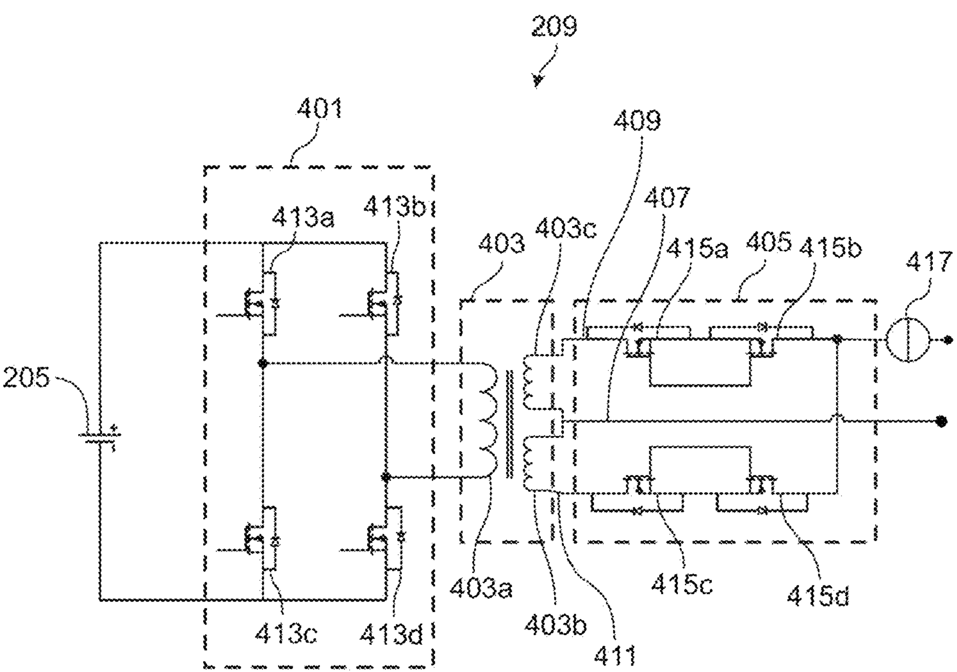
FIG. 4 is a schematic representation of an embodiment of a DC-to-DC converter of an electrical aircraft propulsion system according to the invention.

With reference to FIG. 4, we will now describe an embodiment of a DC-to-DC converter for an electrical aircraft propulsion system. The DC-to-DC converter 209 described is designed to be connected in series with an electrical energy storage unit of a electrical propulsion system such as the electrical energy storage unit 205 of the electrical propulsion system 201 described with reference to FIG. 3.

In the example shown, the DC-to-DC converter 209 comprises an inverter 401 configured to supply an AC voltage from a DC voltage known as the input voltage which is supplied by the electrical energy storage unit.

The inverter 401 is a single-phase inverter, i.e., it receives an alternating electric current on a transmission line consisting of two parallel wires, namely, respectively, a line comprising transistors 413*a* and 413*c* and a line comprising transistors 413*b* and 413*d*.

In the example shown, the inverter comprises four transistors 413*a*, 413*b*, 413*c* and 413*d* distributed over two lines of two transistors in series. However, the person skilled in the art will appreciate that the invention applies to an inverter comprising a number of transistors greater than two on each of the two lines.

Examples include MOSFET type transistors (Metal Oxide Semiconductor Field Effect Transistor) or IGBT type transistors (Insulated Gate Bipolar Transistor).

In an advantageous embodiment, the transistors of the inverter, 413*a*, 413*b*, 413*c* and 413*d* shown in FIG. 4, are made from a material that allows a high switching frequency to be obtained, such as SiC (Silicon Carbide) or GaN (Gallium Nitride). In this way, the size of the magnetic components (transformers and inductance) is advantageously smaller, and the volume of the inverter is minimised.

In addition, the use of a high switching frequency, i.e., typically greater than greater than a few tens of kHz, or even of the order of or greater than a hundred kHz, allows to increase the frequency of the chopped signal (the current or voltage at the output of the inverter and rectifier stages) and also to improve its control (current and voltage control).

For example, with IGBT type transistors, a switching frequency of up to 30 or 40 kHz can be used. With transistors made from large-gap materials such as SiC or GaN, it is possible to go even further. For example, it is possible to obtain switching frequencies of the order of 100-200 kHz.

The DC-to-DC converter 209 also includes a transformer 403 configured to generate at least one AC voltage from the AC voltage supplied at the output of the inverter 401.

In the example shown, the transformer 403 is said to be a step-down transformer in that it is configured to generate a lower voltage at the output than at the input. This is because the voltage from the electrical energy storage unit used is much higher than the voltage required to ensure control of the current flowing between the electrical energy storage unit and the HVDC bus, which is one of the purposes of using the DC-to-DC converter as described below.

However, in certain embodiments of the invention, it is possible to use a so-called step-up transformer, depending in particular on whether or not the electrical energy storage unit used, to which the DC-to-DC converter is connected, is reversible. In fact, typically, the electrical energy storage unit has a nominal voltage higher than the voltage of the network to allow easier control of the flow of power from the storage unit to the network. However, in some cases of conventional monthly use, the source has a lower voltage and needs to be coupled with a step-up transformer to allow proper transfer of power from the source to the network. In all cases, the architecture is fixed and the type of transformer used is determined in advance.

In addition, in the various embodiments of the DC-to-DC converter, the transformer can be planar or wound.

In addition, in the example shown of the DC-to-DC converter 209, the transformer 403 comprises a primary 403*a* and two secondaries 403*b* and 403*c*. Advantageously, the transformer can be configured to provide galvanic isolation between the primary 403*a* and the two secondaries 403*b* and 403*c*.

The two secondaries 403*b* and 403*c* have a common terminal 407 which is designed to be connected directly to the HVDC bus 207 and two other terminals 409 and 411 which are connected to the two arms of a rectifier 405 described below.

The DC-to-DC converter 209 also includes a rectifier 405 configured to supply a DC output voltage from one or more AC voltages coming from the transformer 403.

As will be seen in more detail below, the rectifier 405 is a so-called four-quadrant rectifier. In particular, this means that its architecture, together with the way it is (or can be) controlled, has the ability to output a negative or positive voltage (i.e., to be step-down or step-up) and also the ability to flow a current from the electrical energy storage unit to the HVDC bus or vice versa.

In other words, all degrees of control are made possible and it is possible to charge or discharge the storage unit with a battery voltage lower or higher than the voltage of the HVDC bus.

In the example shown, the rectifier 405 comprises four transistors 415*a*, 415*b*, 415*c* and 415*d* which may also be, for example, of the MOSFET type or IGBT type. As with the inverter, the rectifier shown comprises two lines (two arms) of two transistors in series. However, the invention also applies to a rectifier comprising a higher number of transistors per line.

Finally, as described above with reference to FIG. 2 and FIG. 3, the DC-to-DC converter 209 also comprises a current source 417, connected to the two arms of the rectifier 405 (for example via a common terminal for these two arms), which consists, on the one hand of an inductor and, on the other hand, of either the storage unit 205 or another storage unit.

Thus, in the example shown in FIG. 3, the current source consists of the inductor 213 and the storage unit 205. Furthermore, as can also be seen in FIG. 3, the reference levels (and therefore the reference voltages) of the DC-to-DC converter 209 and the HVDC bus 207 are connected to each other via the current source (formed by the inductor 213 and the storage unit 205). In other words, the output of the two rectifier arms 405 is connected to the current source 417, which is connected to a reference level of the HVDC bus 207.

It is this current source 417 that controls the power flowing from the storage unit 205 to the HVDC bus 207. In particular, the use of the current source 417 allows to impose a voltage at the output of the DC-to-DC converter which regulates the current passing between the electrical storage unit and the HVDC bus and, if necessary, maintains a different voltage level between the electrical energy storage unit and the HVDC bus. The DC-to-DC converter 209 is therefore said to be of partial power because of its ability to transmit only part of the power supplied by the storage unit to which it is connected.

As a result, the DC-to-DC converter can control the state of charge of the electrical energy storage unit independently of the voltage of the HVDC bus and control the transient current to the terminals of the electrical energy storage unit. This last point preserves the integrity of the electrical energy storage unit and prevents thermal runaway which could damage it.

In addition, the invention also applies to an electrical propulsion system which comprises a plurality of electrical energy storage units in parallel, each having a DC-to-DC converter such as that described.

Advantageously, such a DC-to-DC converter can be sized for the operating range of the electrical energy storage unit, i.e., as a function of the current and voltage ratings.

Advantageously also, the DC-to-DC converter enables the voltage of the electrical energy storage unit and that of the HVDC bus to be equalised while regulating the current flowing between the two. In this way, the electrical propulsion system can be reconfigured (i.e., an electrical energy storage unit can be added or removed) without damaging or stressing an electrical energy storage unit already in use.

Secondly, when the voltage of the electrical energy storage unit and that of the HVDC bus are close, the efficiency of the DC-to-DC converter is close to 100%, since in this case no current flows between the electrical energy storage unit and the HVDC bus.

FIGS. 4 to 9 show various embodiments of a DC-to-DC converter for an electrical aircraft propulsion system according to the invention. In particular, these figures illustrate in more detail several examples of the architecture of the rectifier 405 of the DC-to-DC converter 209.

In particular, in FIG. 4, the transistors 415*a* and 415*b* of the rectifier 405 are connected in series with the secondary 403*b* and the transistors 415*c* and 415*d* of the rectifier 405 are connected in series with the secondary 403*c* of the transformer 403. In addition, in this example, the grids of the two transistors connected in series to each secondary are common. Advantageously, this configuration allows to limit the number of signals required to control the rectifier.

Figure 5:
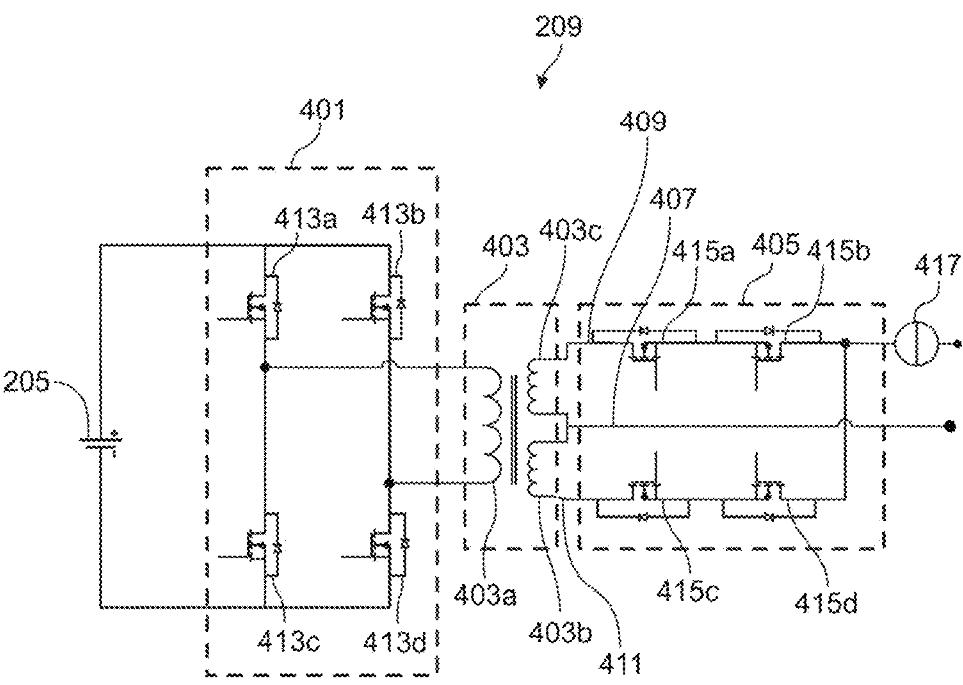
FIG. 5 is a schematic representation of an embodiment of a DC-to-DC converter of an electrical aircraft propulsion system according to the invention.

In contrast, in the example shown in FIG. 5, the grids of the two transistors connected in series to each secondary are separate. Advantageously, this configuration allows to increase the control options of the rectifier (by enabling separate control of each transistor).

Figure 6:
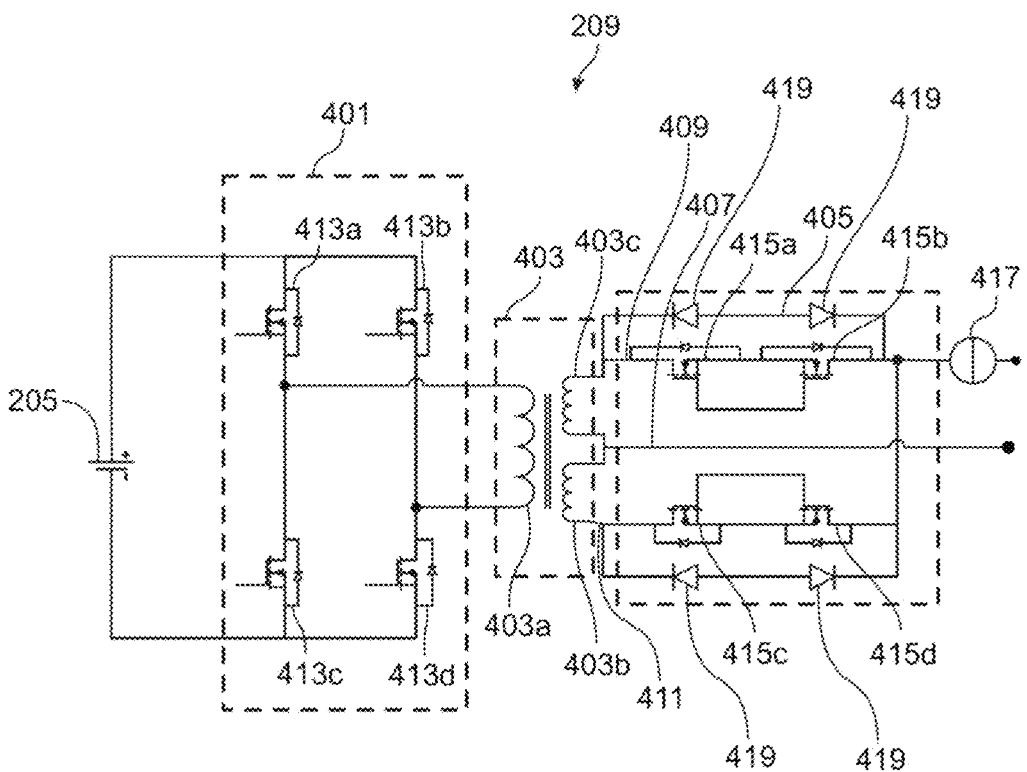
FIG. 6 is a schematic representation of an embodiment of a DC-to-DC converter of an electrical aircraft propulsion system according to the invention.
Figure 7:
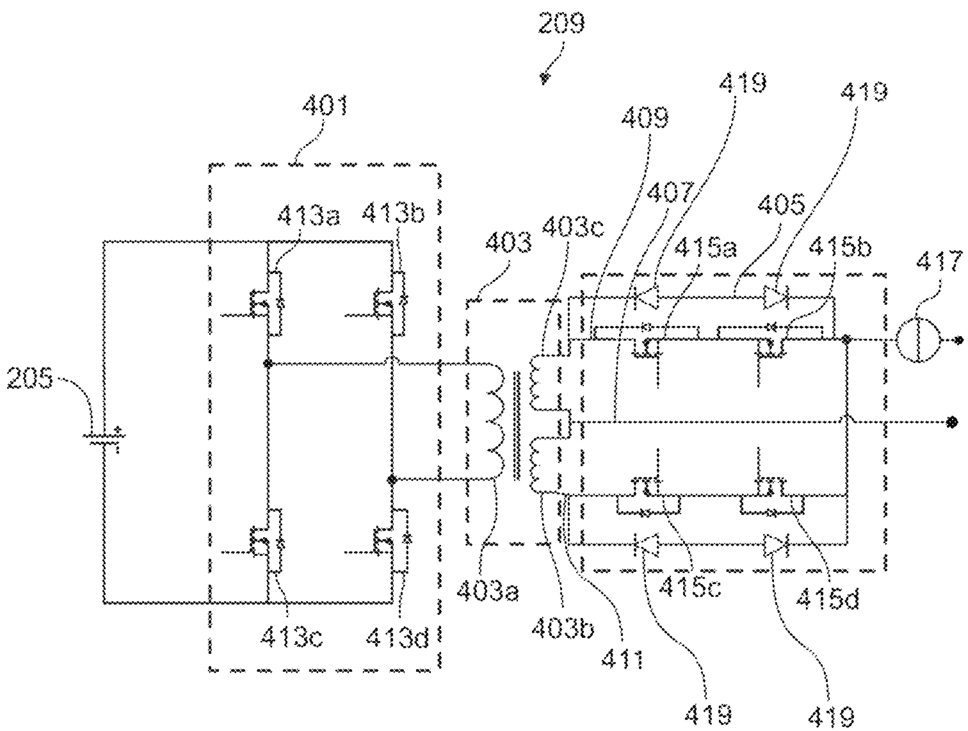
FIG. 7 is a schematic representation of an embodiment of a DC-to-DC converter of an electrical aircraft propulsion system according to the invention.

In the examples shown in FIG. 6 and FIG. 7, diodes 419 connected in parallel to transistors 415*a*, 415*b*, 415*c* and 415*d* are configured to protect transistors 415*a*, 415*b*, 415*c* and 415*d* from any overvoltage. Furthermore, in the first case, the grids of the two transistors connected in series to each secondary are common and, in the second case, the grids of the two transistors connected in series to each secondary are separate.

Figure 8:
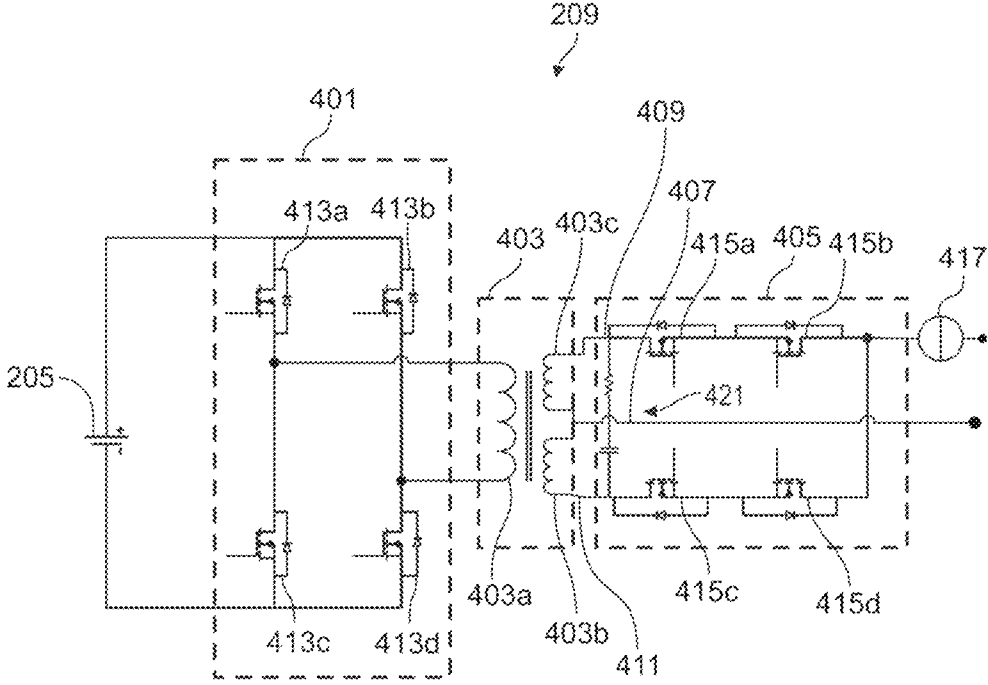
FIG. 8 is a schematic representation of an embodiment of a DC-to-DC converter of an electrical aircraft propulsion system according to the invention.
Figure 9:
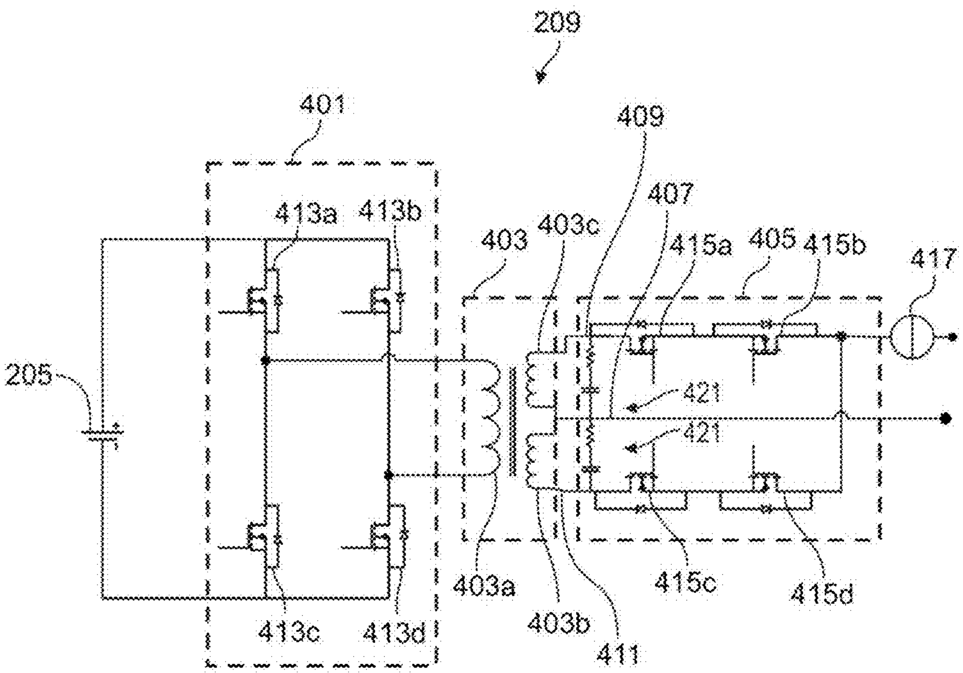
FIG. 9 is a schematic representation of an embodiment of a DC-to-DC converter of an electrical aircraft propulsion system according to the invention.

Finally, in the examples shown in FIG. 3, FIG. 8 and FIG. 9, one or more filters 421 are connected to terminals of the rectifier.

For example, one or more filters can be connected between the transformer and the rectifier or between the two drains of two MOSFET transistors on each arm of the rectifier, in parallel with the transistors.

These filters 421 eliminate certain unwanted frequencies from the voltage reaching the rectifier 405. In this case, the filters used are of the RC type, i.e., using the combination of a resistor and a capacitor connected in series to filter certain frequencies.

Figure 10:
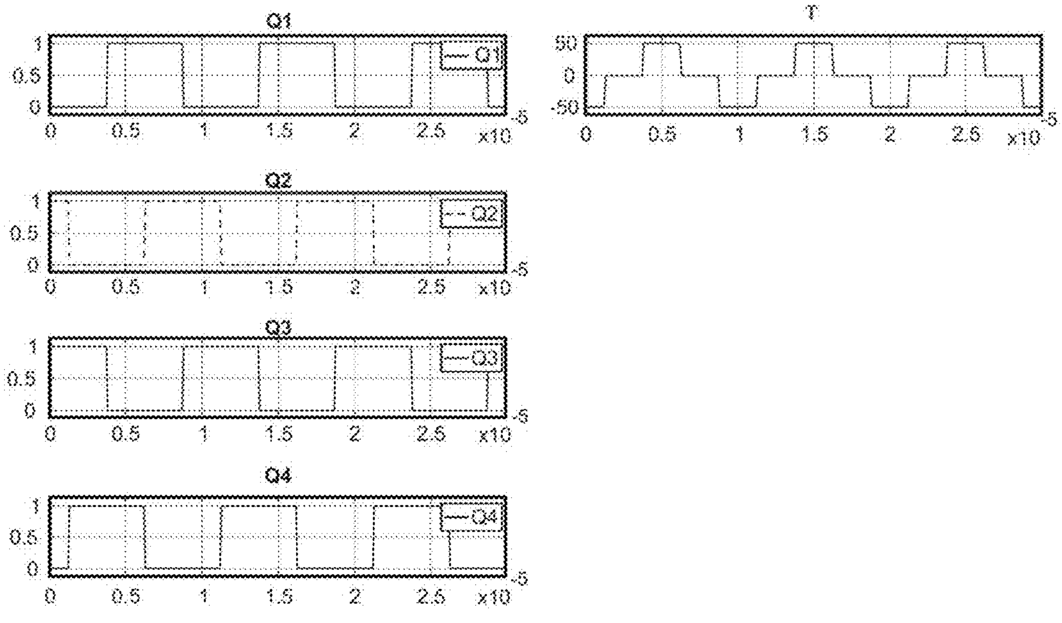
FIG. 10 is an example of a transistor control sequence of an inverter of a DC-to-DC converter according to the invention and of an AC voltage generated by the inverter in response to this control sequence.
Figure 11:
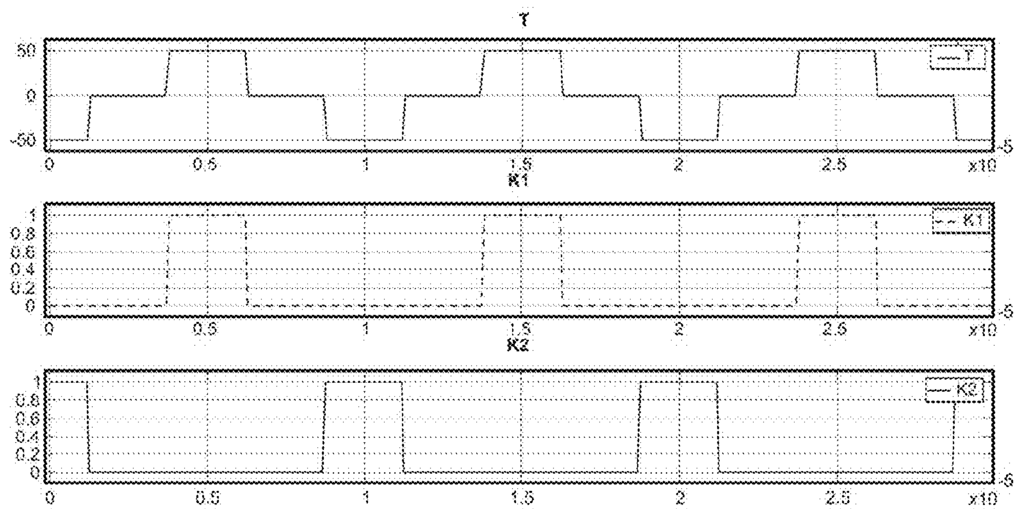
FIG. 11 is an example of the voltages obtained at the terminals of the two arms of a rectifier of a DC-to-DC converter according to the invention from the voltage generated by the inverter in the example shown in FIG. 10.

FIG. 10 and FIG. 11 show an example of a control applied to a DC-to-DC converter according to the invention and the voltage obtained at the output of the converter from such a control.

In particular, FIG. 10 shows, on the left, an example of a sequence for controlling the transistors of an inverter of a DC-to-DC converter such as that shown in FIG. 6. The control sequence corresponds to a sequence of voltages applied as a function of time (x-axis) to the inverter's four transistors. For example, the voltages shown can be sent to terminals G (for gate) and S (for source) of a transistor type MOSFET or G and E (for emitter) of a transistor type IGBT.

In particular, references Q1, Q2, Q3 and Q4 correspond respectively to transistors 413*a*, 413*b*, 413*c* and 413*d* in FIG. 6. Each control voltage is a square-wave signal changing from a zero value to a positive value (normalised to 1 in the example) and causing the transistor to behave like an open or closed switch respectively.

The right-hand side of FIG. 10 shows the voltage resulting from this control sequence and applied to the primary of the transformer (called the primary voltage) of the DC-to-DC converter.

FIG. 11 shows examples of voltages obtained at the terminals of the two arms of a rectifier of a DC-to-DC converter such as that described with reference to FIG. 6 from the voltage generated by the inverter according to the example given in FIG. 10.

In particular, the top curve shows the primary voltage obtained from the control sequence applied to the inverter as described with reference to FIG. 10.

The middle curve and the bottom curve show the voltages obtained at the terminals of the two arms of the rectifier of the DC-to-DC converter (which are respectively connected to the two secondaries of the transformer of the converter) from this primary voltage. In particular, the voltage K1 corresponds to the voltage obtained at the terminals of the line of two transistors in series 415*a* and 415*b*, while the voltage K2 corresponds to the voltage obtained at the terminals of the line of two transistors in series 415*c* and 415*d*.

Finally, thanks to the type of DC-to-DC converter used at the interface between the electrical energy storage unit and the rest of the electrical propulsion system, it is possible for the electrical propulsion system to generate high average power over a long period of time, to generate high instantaneous electrical power and to be as compact as possible in terms of weight and volume.

The invention claimed is:

1. A DC-to-DC converter for an electrical aircraft propulsion system designed to be connected in series with an electrical energy storage unit of said electrical propulsion system, said DC-to-DC converter comprising an inverter configured to supply a first AC voltage from a DC input voltage coming from the electrical energy storage unit, a transformer configured to supply at least one second AC voltage from the first AC voltage and a rectifier configured to supply an output DC voltage from said at least one second AC voltage, said DC-to-DC converter being characterised in that it further comprises a current source, connected to the rectifier and configured to control the power transiting through said DC-to-DC converter, in that the transformer comprises a primary and two secondaries, the two secondaries having a common terminal designed to be connected to a high-voltage DC bus of the electrical propulsion system and two other terminals connected to the rectifier, the reference levels of the DC-to-DC converter and of the HDVC bus being connected to each other through the current source, and in that the rectifier comprises two arms, each comprising at least two transistors in series and connected, on the one hand, to the two other terminals of the transformer and, on the other hand, to the current source.

2. The DC-to-DC converter according to claim 1, wherein the current source comprises an inductor and an electrical energy storage unit.

3. The DC-to-DC converter according to claim 1, wherein the inverter comprises a plurality of transistors, preferably four MOSFET-type or IGBT-type transistors.

4. The DC-to-DC converter according to claim 3, wherein the transistors have a switching frequency greater than a few tens of kHz, advantageously of the order of or greater than a hundred kHz.

5. The DC-to-DC converter according to claim 1, wherein the transformer is configured to step down said at least one second AC voltage relative to the first AC voltage.

6. The DC-to-DC converter according to claim 1, wherein the transformer is of the planar type or of the wound type.

7. The DC-to-DC converter according to claim 1, wherein the transformer is configured to provide galvanic isolation between the primary and the two secondaries of said transformer.

8. The DC-to-DC converter according to claim 1, wherein the rectifier comprises four transistors with two transistors connected in series to each secondary of the transformer, said transistors being of the MOSFET type.

9. The DC-to-DC converter according to claim 8, wherein the gates of the two transistors connected in series to each secondary are common.

10. The DC-to-DC converter according to claim 8, wherein the gates of the two transistors connected in series to each secondary are separate.

11. The DC-to-DC converter according to claim 8, wherein diodes, connected in parallel to the transistors, are configured to protect said transistors from overvoltages.

12. The DC-to-DC converter according to claim 1, wherein at least one filter, preferably of the RC filter type, is connected between the transformer and the rectifier.

13. The DC-to-DC converter according to claim 1, wherein a filter, preferably of the RC filter type, is connected to the terminals of each arm of the rectifier, in parallel with the transistors.

14. An electrical aircraft propulsion system comprising at least one thermoelectric source and an electrical energy storage unit configured to supply electrical energy to a high-voltage DC bus designed to supply charges, said electrical aircraft propulsion system further comprising a DC-to-DC converter according to claim 1.

15. The electrical aircraft propulsion system according to claim 14, wherein the electrical energy storage unit is an electrolytic current source, such as a supercapacitor, or an electrochemical current source, such as a battery.

16. The electrical aircraft propulsion system according to claim 14, further comprising a contactor configured to connect directly, when activated, a high potential of the high-voltage DC bus with a high potential of the electrical energy storage unit.

17. An aircraft comprising an electrical propulsion system according to claim 14.

* * * * *